(12) United States Patent
Leneutre

(10) Patent No.: US 6,254,207 B1
(45) Date of Patent: Jul. 3, 2001

(54) ENCLOSURE, IN PARTICULAR CABINET, ESPECIALLY FOR ELECTRICAL EQUIPMENT

(75) Inventor: Pascal Leneutre, Fresne-le-Plan (FR)

(73) Assignees: Legrand; Legrand SNC, both of Limoges (FR)

(*) Notice: Subject to any disclaimer, the term of this patent is extended or adjusted under 35 U.S.C. 154(b) by 0 days.

(21) Appl. No.: 09/245,877

(22) Filed: Feb. 8, 1999

(30) Foreign Application Priority Data

Feb. 11, 1998 (FR) .................................................. 98 01626

(51) Int. Cl.⁷ .................................................. A47B 47/03
(52) U.S. Cl. ........................................ 312/263; 312/265.5
(58) Field of Search .................................. 312/263, 265.1, 312/265.2, 265.3, 265.4, 265.5, 265.6, 140, 111, 257.1, 223.1; 211/26, 189

(56) References Cited

U.S. PATENT DOCUMENTS

| | | | |
|---|---|---|---|
| 2,058,263 | * 10/1936 | Rosendale | 312/265.4 |
| 3,087,768 | * 4/1963 | Anderson et al. | 312/263 X |
| 3,265,419 | * 8/1966 | Durnbaugh et al. | 312/265.5 X |
| 3,297,383 | * 1/1967 | Fay | 312/265.4 |
| 3,307,894 | * 3/1967 | Collier | 312/265.2 |
| 4,426,935 | * 1/1984 | Nikoden, Jr. | 312/265.5 X |
| 5,590,939 | * 1/1997 | Piontek | 312/265.1 X |
| 5,791,498 | * 8/1998 | Mills | 312/140 X |

FOREIGN PATENT DOCUMENTS

| | | |
|---|---|---|
| 0010291 | 4/1980 | (DE) . |
| 0762586 | 3/1997 | (EP) . |
| 2744847 | 8/1997 | (FR) . |
| 9310692 | 6/1993 | (WO) . |

OTHER PUBLICATIONS

British Industries Corporation, "Widney—Dorlec cabinet components", four pages, Mar. 1955.*

* cited by examiner

*Primary Examiner*—Peter M. Cuomo
*Assistant Examiner*—James O. Hansen
(74) *Attorney, Agent, or Firm*—Young & Thompson (57) ABSTRACT

An enclosure comprises a surround that forms its top wall, its bottom wall and its side walls, a support frame attached to its rear edge, and a back pressed against an outside face of the support frame. Supports are provided inside the surround for fixing equipment of any kind and, inside the surround, in each corner area thereof, is a respective corner piece to which the back can be attached by at least one fixing device. The back itself comprises the supports for fixing equipment. Applications include wall-mount cabinets.

30 Claims, 5 Drawing Sheets

ENCLOSURE, IN PARTICULAR CABINET, ESPECIALLY FOR ELECTRICAL EQUIPMENT

BACKGROUND OF THE INVENTION

1. Field of the Invention

The present invention concerns enclosures for housing and protecting electrical equipment of any kind, for example.

It is more particularly, but not necessarily exclusively, aimed at enclosures of the above kind designed to be attached to a support of any kind, for example a wall, without resting on the floor, and usually known as cabinets.

To be even more precise the present invention is aimed at enclosures of the above kind which, independently of any door, include a surround that forms their top wall, their bottom wall and their side walls and to the rear edge of which is attached a frame referred to for convenience hereinafter as the support frame, and a back which is pressed against the outside face of the support frame, preferably in a watertight manner, and with which are associated, inside the surround, for fixing the equipment concerned, support means suitable for fixing equipment of any kind.

2. Description of the Prior Art

When the enclosure is made of metal the back is usually welded to the support frame provided for it at the rear of the surround.

This is because the corresponding joint must be sufficiently strong to transfer to the back forces due to the surround and to any door with which the latter may be fitted.

What is more, the enclosure is usually fixed to a support by its back and it is therefore the back that directly carries support means suitable for fixing equipment, for example in the form of studs that are also welded to it.

The above arrangements, whereby the back constitutes the key component of the enclosure, the surround merely constituting a covering carried by the back, have proved satisfactory and may continue to do so.

However, they suffer from the drawback that an enclosure of the above kind can be painted only after assembly, i.e. after the back has been welded to the support frame of the surround.

One result of this is that painting must be carried out by immersion, possibly in association with electrostatic powder coating, in order to paint the corners of the surround in a satisfactory manner, in particular in the vicinity of the back. This is relatively costly.

The corresponding bath gives rise to environmental and pollution problems which can be difficult and costly to overcome.

What is more, before the painting operation is carried out the studs carried by the back must be covered so that they remain at least partly free of paint so that they can thereafter assure the electrical continuity function that is usually required in an enclosure containing electrical equipment. This is relatively costly.

The general aim of the present invention is to provide an arrangement that avoids the above drawbacks.

SUMMARY OF THE INVENTION

To be more precise, the present invention consists in an enclosure comprising a surround that forms its top wall, its bottom wall and its side walls, a support frame attached to its rear edge, a back pressed against an outside face of said support frame, support means inside said surround for fixing equipment of any kind and, inside said surround, in each corner area thereof, a respective corner piece to which said back can be attached by at least one fixing means and which itself comprises said support means for fixing equipment.

The corner pieces provided in this way in accordance with the invention contribute to the assembly of the enclosure because they are used to fix the back to the support frame of the surround and so it is advantageously possible to paint the back and the surround before assembly.

The corresponding operation can therefore advantageously be effected other than by dipping, for example electrostatically, so advantageously avoiding the drawbacks of dip painting.

What is more, the corner pieces in accordance with the invention themselves incorporate the support means for fixing equipment, so the back is advantageously spared the presence of any stud, which avoids having to fit covers to the studs before painting is carried out.

In accordance with one development of the invention the fixing means by which the back is attached to the corner pieces in accordance with the invention preferably pass also through the support frame of the surround, the support frame being as it were sandwiched between the corner pieces and the back.

In this way the corner pieces in accordance with the invention are attached to the surround through the intermediary of the support frame and it is just as if they were part of the surround.

In accordance with a complementary development of the invention, at least one fixing hole is provided in each corner area of the surround for fixing the enclosure to a support of any kind and the fixing hole is in the corresponding corner piece.

In this way the corner pieces in accordance with the invention advantageously contribute to fixing with the result that, because of them, the surround constitutes the main part of the enclosure.

The features and advantages of the invention will become more apparent from the following description given by way of example with reference to the accompanying diagrammatic drawings.

DETAILED DESCRIPTION OF THE PREFERRED EMBODIMENT

The figures show by way of example the application of the invention to the situation in which the enclosure concerned is a cabinet to be fixed to a support of any kind (not shown), for example a wall.

The enclosure 10 has a globally parallelepiped-shape contour and comprises a surround 11 that forms a top wall 12, a bottom wall 13 and its side walls 14, and to which a frame 16 referred to hereinafter for convenience as the support frame is attached along its rear edge 15, as described in more detail hereinafter, and a back 18 which is pressed against the outside face 19 of the support frame 16 and with which support means 20 for fixing equipment of any kind are associated, inside the surround 11 and as described in more detail hereinafter.

The enclosure 10 is not in itself relevant to the present invention and will therefore not be described in complete detail here.

Only its parts necessary to an understanding of the invention will be described.

In this regard, suffice to say that in the embodiment shown the support frame 16 of the surround 11 is in one piece with the surround 11, the support frame 16 being formed by right-angle rings on the walls 12, 13, 14 constituting the surround.

For example, in the case of that corner area A of the surround 11 seen more clearly in the figures, and which is in practice its bottom lefthand corner area, the support frame 16 is formed by a right-angle rim 13' of the bottom wall 13 of the surround 11 and a right-angle rim 14' of its corresponding side wall 14.

Figure 4:
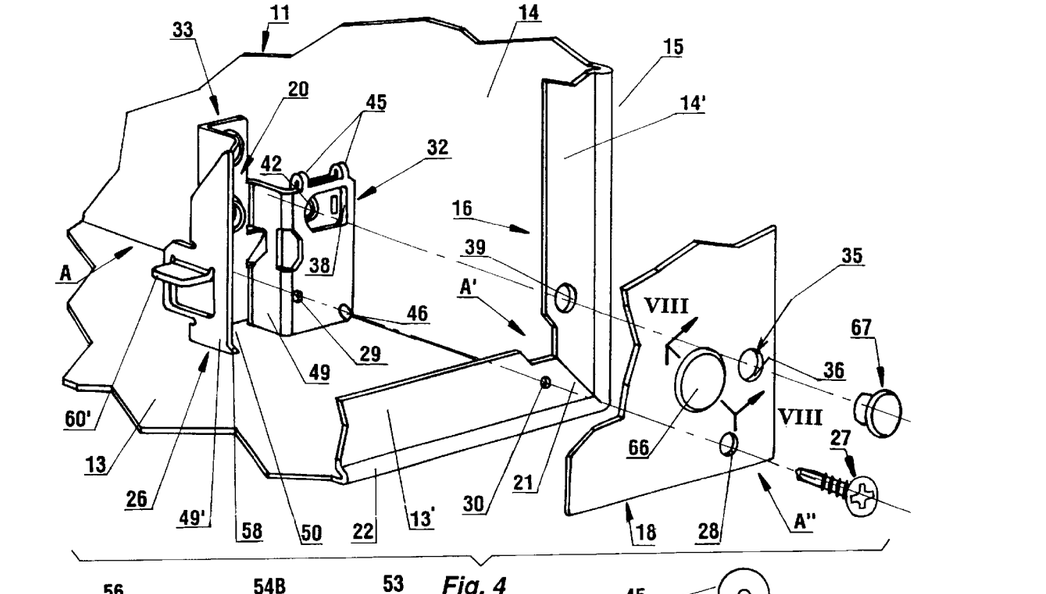
FIG. 4 is an exploded perspective view deduced from FIG. 3 showing part of the enclosure as seen from the rear.
Figure 5:
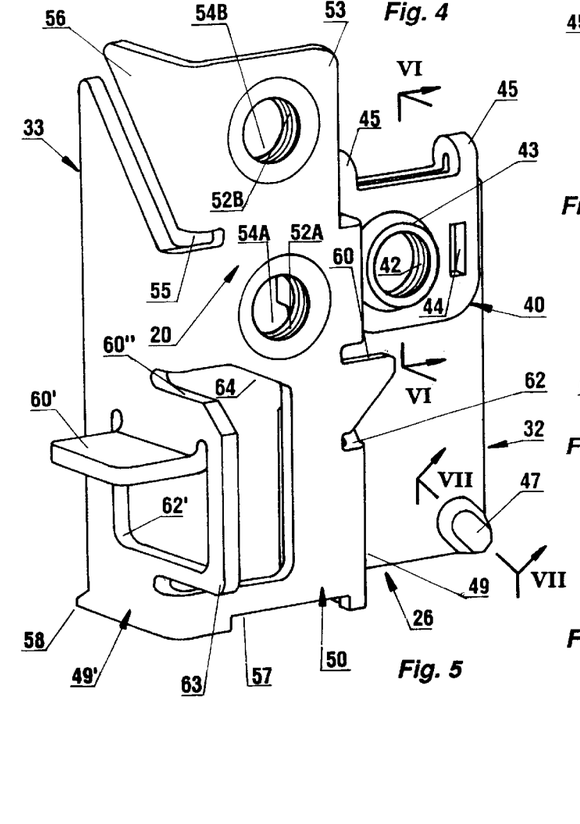
FIG. 5 is a perspective view to a larger scale of one of the corner pieces of the enclosure in accordance with the invention.
Figure 6:
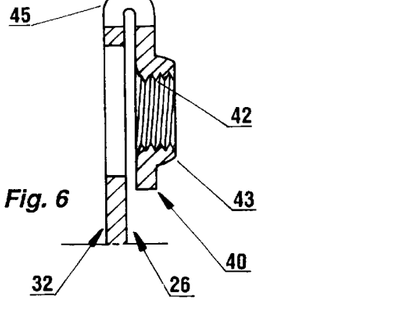
FIGS. 6 and 7 are sectional views of the corner piece respectively taken along the lines VI—VI and VII—VII in FIG. 5 and to a still larger scale.
Figure 7:
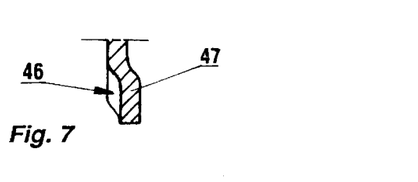
Figure 8:
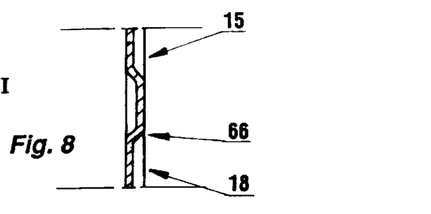
FIG. 8 is a sectional view of part of the back of the enclosure in accordance with the invention taken along the line VIII—VIII in FIG. 4 and to a larger scale.

As shown in FIG. 4, the ends of the right-angle rims 13', 14' abut against each other along a cutting line 21 at 45°.

Figures 1, 2, 3:
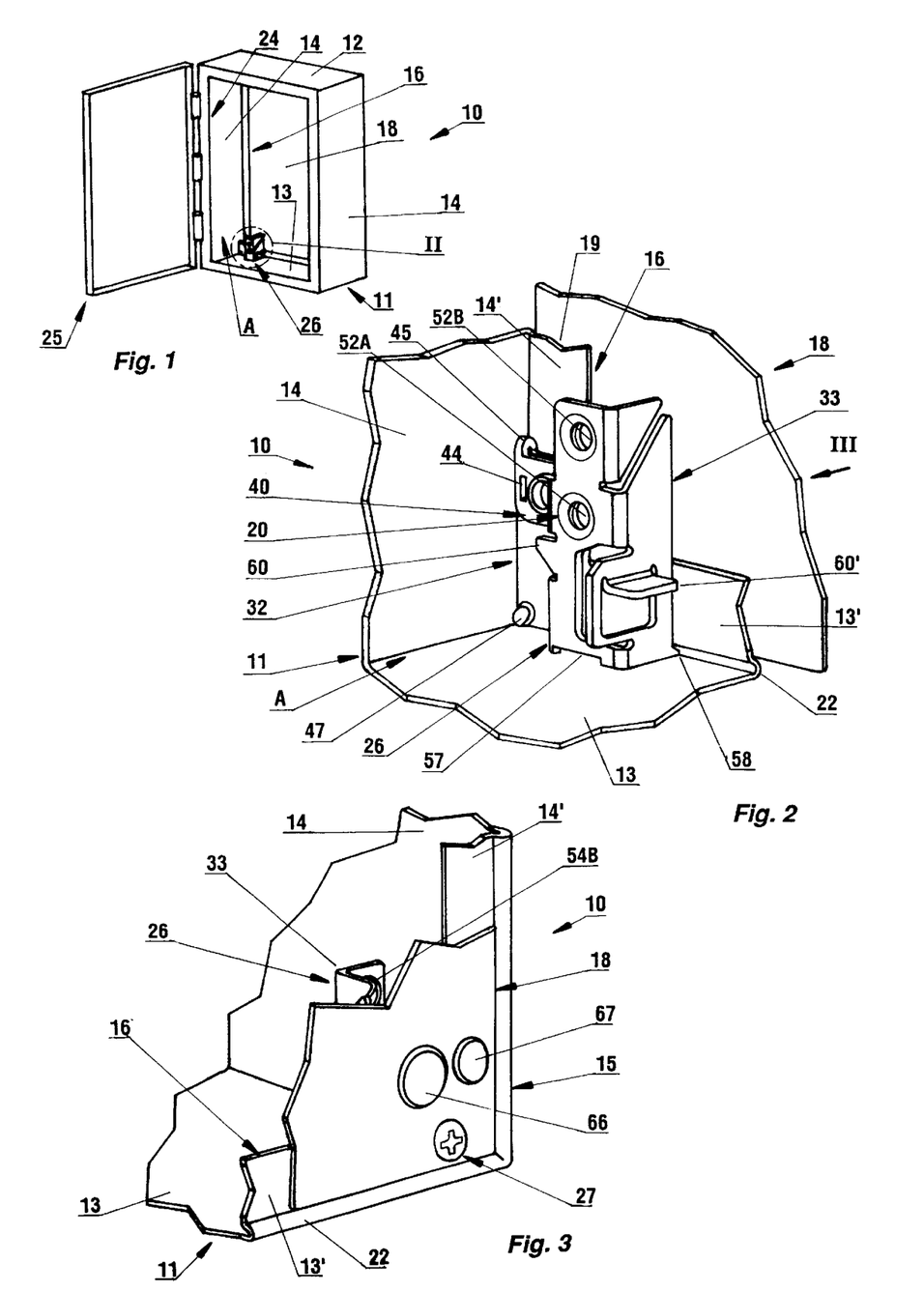
FIG. 1 is a perspective view of an enclosure in accordance with the invention.
FIG. 2 shows the detail II from FIG. 1 to a larger scale.
FIG. 3 is a perspective view of part of the enclosure in accordance with the invention to a different scale and seen from the rear, in the direction of the arrow III in FIG. 2.

In the embodiment shown, and as seen more clearly in FIGS. 3 and 4, the support frame 16 is set back relative to the rear edge 15 of the surround 11 and is joined to the latter by a bend 22.

Because of the bend 22 the back 18 is totally enclosed within the surround 11.

As shown here, for example, the flanks of the bend 22 are not contiguous, one of them extending the corresponding wall 12, 13, 14 of the surround 11 and the other diverging from the wall 12, 13, 14.

The surround 11 and the support frame 16 can be formed at the same time by cutting and bending a single metal blank, the surround 11 then being formed into a closed loop, which is preferably watertight, for example by a weld along the edge in one of its corner areas A.

In the embodiment shown the front of the surround 11 forms a door frame 24 substantially parallel to the support frame 16 at the rear and the enclosure 10 is completed by a door 25 which in the closed position is pressed against the door frame 24, preferably in a watertight fashion.

In accordance with the invention, the enclosure 10 includes inside the surround 11, in each of the corner areas A thereof, a corner piece 26 to which the back 18 is attached by at least one fixing means 27 and which itself incorporates the support means 20 for fixing equipment.

As in the embodiment shown, the fixing means 27 associated with the corner piece 26 is preferably operative from the rear (FIG. 4) and engages with the corner piece 26 after passing through a hole 28 provided for this purpose in the back 18.

As shown here, for example, the fixing means 27 is a self-tapping screw passing freely through the back 18 and cutting its own thread in the corner piece 26.

In the embodiment shown the fixing means 27 also passes through the support frame 16, in which it cuts its own thread.

As shown here, for example, a starter hole 29 for the fixing means 27 is provided in the corner piece 26 and a starter hole 30 is provided in the support frame 16.

The starter holes 29, 30 are of course aligned with the hole 28 in the back 18.

In the embodiment shown there is only one fixing means 27 for each of the corner areas A of the surround 11.

In the embodiment shown the corner piece 26 in accordance with the invention has, side by side in the corresponding corner area A of the surround 11, a flange 32 as close as possible to the support frame 16 and by means of which the associated fixing means 27 is operative and, substantially parallel to the corresponding side wall 14 of the surround 11, an upright 33 projecting from the support frame 16 and by means of which the support means 20 for fixing equipment is operative.

The starter hole 29 is therefore in the flange 32.

As shown here, for example, it flanks the upright 33.

In a manner that is known in itself at least one fixing hole 35 is provided in each corner area A of the surround 11 for fixing the enclosure 10 to its support.

In accordance with the invention the fixing hole 35 is in the corresponding corner piece 26.

To be more precise the fixing hole 35 comprises a hole 36 in the back 18 and a recess 38 in the flange 32 of the corner piece 26 aligned with the hole 36 in the back 18.

As in the embodiment shown, the fixing hole 35 referably also passes through the support frame 16, the fixing hole 35 including a hole 39 in the support frame 16 aligned with the hole 36 in the back 18.

As shown here, for example, the hole 36 in the back 18 has a circular contour as does the hole 39 in the support frame 16.

The same can apply to the recess 38 in the flange 32 of the corner piece 26.

However, in the embodiment shown, the recess 38 has its length extending across the width of the flange 32, a globally rectangular contour and a semi-circular edge nearest the upright 33.

In the embodiment shown, and for reasons that will become apparent hereinafter, the flange 32 of the corner piece 26 is extended by a U-shaped lug 40 which has a screwthreaded hole 42 in it on the same side as its front face and aligned with its recess 38.

As in the embodiment shown, the screwthreaded hole 42 is preferably an axial hole in an eyelet 43 projecting from the front face of the lug 40.

In the embodiment shown the lug 40 incorporates a slot 44 parallel to its lateral edges within the outline of the recess 38 in the flange 32.

To facilitate possible unbending of the lugs 40 extending the flange 32 of the corner piece 26 in this way, the bend area whereby the lug 40 is joined to the flange 32 is reduced to two bridges 45 in the embodiment shown, spaced from each other and in practice along respective lateral edges of the lug 40, their width being a fraction of that of the lug 40.

In the embodiment shown, in the corresponding corner angle A' of the support frame 16, to be more precise in line with the cutting line 21 in the corner area A', the flange 32 of the corner piece 26 forms a housing 46 open towards the support frame 16.

As shown here, for example, the housing 46 is simply formed by local deformation of the flange 32 to form a channel 47.

In the embodiment shown the upright 33 of the corner piece 26 comprises, in succession from the associated flange 32, at least two flats 49, 50, namely a lateral flat 49 substantially perpendicular to the flange 32 and a front flat 50 substantially parallel to the flange 32, at a distance from the support frame 16 and on the opposite side of the lateral flat 49 to the flange 32.

Both flats 49, 50 extend from the bottom edge of the flange 32.

The lateral flat 49 extends the full height of the flange 32.

However, the front flat 50 extends to a height greater than that of the flange.

In the embodiment shown the upright 33 of the corner piece 26 has a U-shaped second lateral flat 49' parallel to the first lateral flat 49 and on the other side of the front flat 50 relative thereto.

The support means 20 for fixing equipment of any kind includes at least one screwthreaded hole 52A, 52B in the front flat 50 of the upright 33.

In the embodiment shown there are two screwthreaded holes 52A, 52B, staggered in height on the upright 33, the screwthreaded hole 52A being in the middle part of the front flat 50 of the upright 33, for example, and the screwthreaded hole 52B in the top part 53 of the front flat 50.

As shown here, the screwthreaded holes 52A, 52B are preferably axial holes in eyelets 54A, 54B projecting from the rear face of the front flat 50.

In the embodiment shown the top part 53 of the front flat 50 incorporating the screwthreaded hole 52A is partly isolated from the remainder of the front flat 50 by a blind slot 55. The blind slot 55 extends obliquely across the lateral flat 49', opening into its top corner area, and the portion 56 of the lateral flat 49' isolated in this way from the remainder of the flat by the blind slot 55 is offset towards the interior of the upright 33 with the corresponding portion of the top part 53 of the front flat 50.

In the embodiment shown, and for reasons that will become apparent hereinafter, the front flat 50 of the upright 33 of the corner piece 26 in accordance with the invention has, along its bottom edge, in the middle area thereof, a notch 57 having a substantially rectangular contour.

In this embodiment the second lateral flat 49' of the upright 33 has a nose-piece 58 where its bottom edge joins its rear edge and by means of which it is engaged with the bend 22 connecting the support frame 16 to the surround 11.

Finally, in the embodiment shown, the corner piece 26 in accordance with the invention has at least one locally projecting bracket 60, 60', 60" for supporting equipment of any kind.

As shown here, for example, there are three brackets 60, 60', 60".

The bracket 60 extends edgewise and consists of the edge of an extension of the front flat 50 of the upright 33 formed in an opening 62 in the first lateral flat 49 of the upright 33.

The bracket 60' extends flat and is constituted by a right-angle rim of the second lateral flat 49' of the upright 33 forming an opening 62' in the second lateral flat 49'.

In the embodiment shown the lateral dimensions of the bracket 60' are increased by a localized extension 63 of the second lateral flat 49', itself forming a hole 64 in the front flat 50.

The bracket 60" extends edgewise, like the bracket 60, and consists of the edge of the localized extension 63 of the second lateral flat 49' of the upright 33.

In practice the bracket 60 is higher than the bracket 60'.

For example, the bracket 60 is substantially in the middle part of the upright 33 and the bracket 60' is in the bottom part of the upright 33.

The bracket 60" is at the same level as the bracket 60.

In practice, in the embodiment shown, the corner piece 26 in accordance with the invention is cut and bent to shape from a metal blank.

In the embodiment shown the back 18 has a localized boss 66 in each of its corner areas A" which projects outwards and is substantially level with the rear edge 15 of the surround 11.

In practice the boss 66 is formed by localized deformation of the back 18.

Finally, the hole 36 in each corner area A" of the back 18 is preferably closed off by a removable plug 67.

The enclosure 10 in accordance with the invention can be assembled in the following manner, for example.

Initially, the back 18 is glued from behind to the outside face of the support frame 16 of the surround 11.

A corner piece 26 is then applied to the support frame 16, from the front, in each corner area A of the surround 11 and a fixing means 27 is engaged with the corner piece 26 from the rear.

The support frame 16 is therefore sandwiched between the corner piece 26 and the back 18 and the fixing means 27 fastens the assembly together.

The fixing means 27 also provides electrical continuity between the components through which it passes: the lower face of its head locally removes paint from the back 18, its shank removes paint from the support frame 16 when it cuts into the starter hole 30 therein and, finally, its shank cuts its way into the starter hole 29 in the corner piece 26.

The housing 46 of the corner pieces 26 in accordance with the invention advantageously forms a reserve enabling application of an additional quantity of glue at the location of the cutting line 21 in each corner area A' of the support frame 16, to the benefit of the seal at this point.

Figures 9, 10:
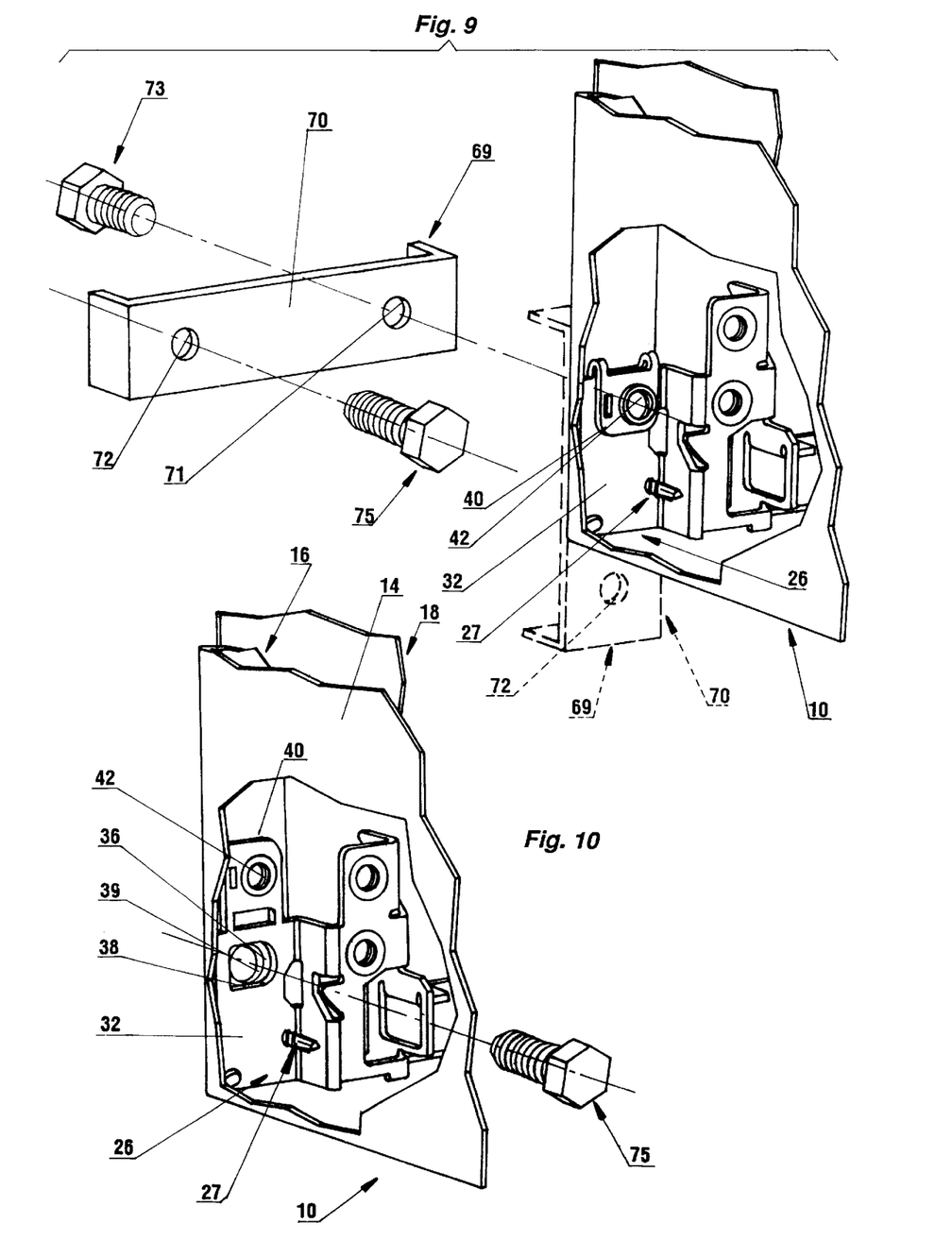
FIG. 9 is a partly cut-away perspective view of part of the enclosure in accordance with the invention, showing a first mode of fixing it.
FIG. 10 is a perspective view analogous to that of FIG. 9 showing a second mode of fixing the enclosure in accordance with the invention.

The enclosure 10 in accordance with the invention can be fixed to a support of any kind either by means of fixing lugs 69, of which there is one in each corner area A of the surround 11, as shown in FIG. 9, or directly, as shown in FIG. 10.

The necessary fixing lugs 69, of which only one can be seen in FIG. 9, are in practice all identical.

Since the fixing lugs 69 do not form any part of the present invention, they have been supposed to be reduced to a U-shape bracket the middle part 70 of which has two spaced holes 71, 72 in it.

The hole 71 receives a screw 73 inserted from the rear and passing freely and successively through the hole 71, the hole 36 in the back 18, after the plug 67 closing off this hole has been removed, the hole 39 in the support frame 16 and the recess 38 in the flange 32 of the corner piece 26, before finally engaging with the screwthreaded hole 42 in the U-shape lug 40 extending the flange 32.

The hole 72 in the fixing lug 69 receives from the front a bolt 75 for fixing the enclosure to the support.

As shown in continuous line in FIG. 9, the fixing lug 69 can be horizontal.

As shown in chain-dotted line in FIG. 9, it can equally be vertical.

If the enclosure 10 is fixed directly to the support concerned, the U-shape lug 40 extending the flange 32 of each of the corner pieces 26 in accordance with the invention is unbent so as to uncover the recess 38 in the flange 32, as shown in FIG. 10.

To this end a tool of any kind, for example the blade of a screwdriver, can be inserted into the slot 44 in the lug 40 to apply leverage to it.

With the hole 39 in the support frame 16 and the hole 36 in the back 18 exposed in this way, all that is then required is to insert the bolt 75 from the front.

Figure 11:
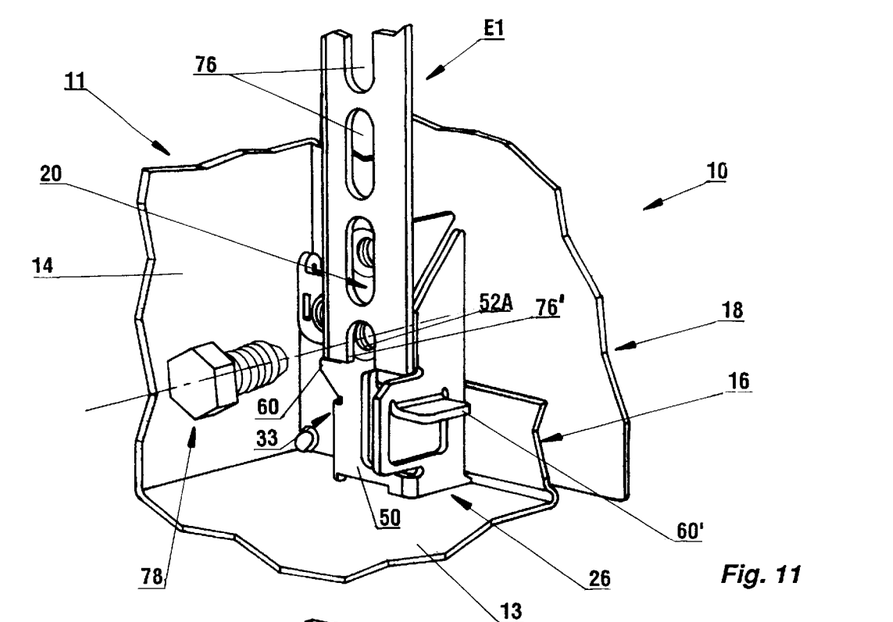
FIG. 11 is a perspective view of part of the enclosure in accordance with the invention, representing the interior of the enclosure and showing installation of a first type of equipment here.

If, as shown in FIG. 11, the equipment E1 to be fitted into the enclosure 10 along each of the side walls 14 of the surround 11 is simply an upright that must extend from one of the corresponding corner pieces 26 to the other and is an angle iron having spaced slots 76 along its front flange and a downwardly open half-slot 76' at the bottom, the front flange of the upright is pressed onto the front flat 50 of the upright 33 of each of the corner pieces 26 concerned, its side flange being pressed against the bracket 60 of the corner piece 26, and the arrangements are such that the half-slot 76' in its front flange is then lined up with the screwthreaded hole 52A of the support means 20 so that the corner piece 26 of this kind can then be attached by means of a screw 78 which is passed through the half-slot 76' and screwed into the screwthreaded hole 52A.

Figure 12:
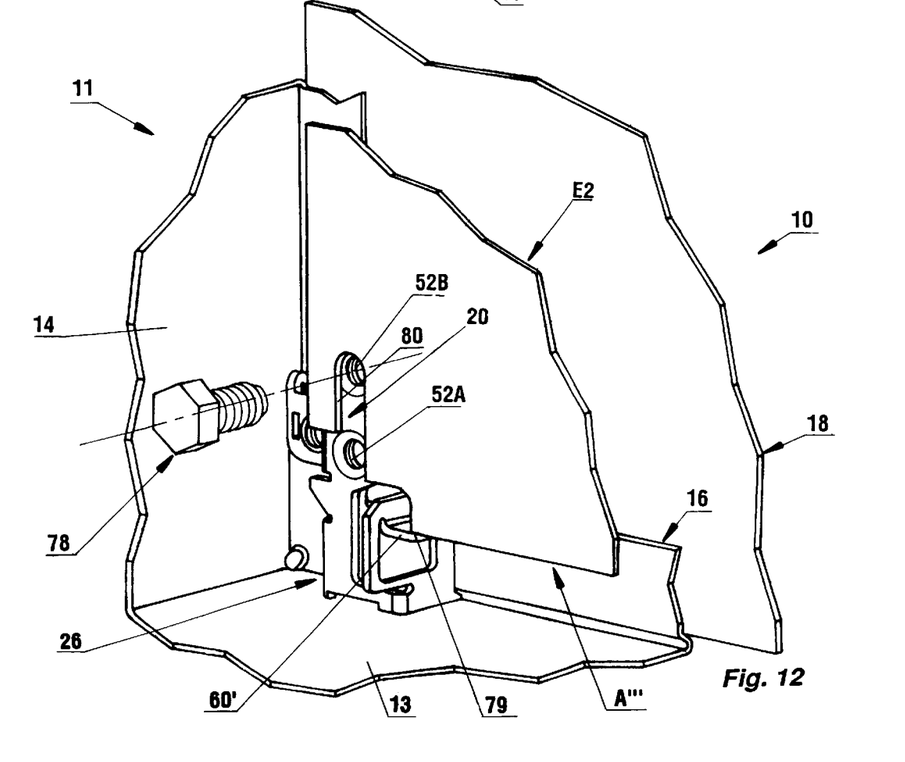
FIGS. 12, 13 and 14 are perspective views analogous to that of FIG. 11 relating to respective different types of equipment.
Figure 13:
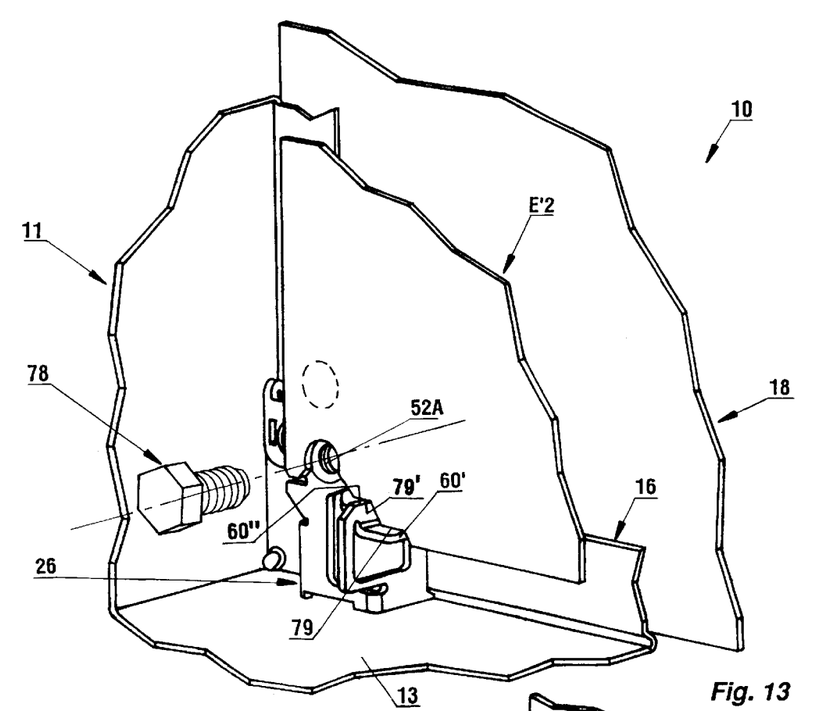

Alternatively, the equipment E2 or E'2 to be fitted into the enclosure 10 can be a plate which, as shown in FIGS. 12 and 13, is to be disposed parallel to the back 18, at a distance therefrom, and fixed to the corner pieces 26 in each of its corner areas A'''.

In each of the corner areas A''', the plate has (in the case of equipment E2) a shoulder 79 formed directly by its edge surface, as shown in FIG. 12, or (in the case of equipment E'2) a shoulder 79' formed by a cut-out in that edge surface, as shown in FIG. 13, and through which it can be caused to bear either, in the former case, on the bracket 60' of the corresponding corner piece (FIG. 12) or, in the latter case, on the bracket 60'' of the corner piece 26 (FIG. 13), and a notch 80 in corresponding relationship to the screwthreaded hole 52B in the support means 20 of the corner piece 26 (equipment E2, FIG. 12) or the screwthreaded hole 52A in the support means 20 (equipment E'2, FIG. 13).

In either case a screw 78 attaches the plate constituting the equipment E2 to each of the corner pieces 26, as previously.

The plate can be solid or perforated (not shown).

The second lateral flat 49' of the upright 33 of the corner piece 26 in accordance with the invention clearly has the advantage of avoiding the plate being inadvertently inserted beyond the front flat 50 of the upright 33 when, as described hereinabove, the equipment to be fitted into the enclosure 10 is equipment E2 or E'2 constituting a plate.

Figure 14:
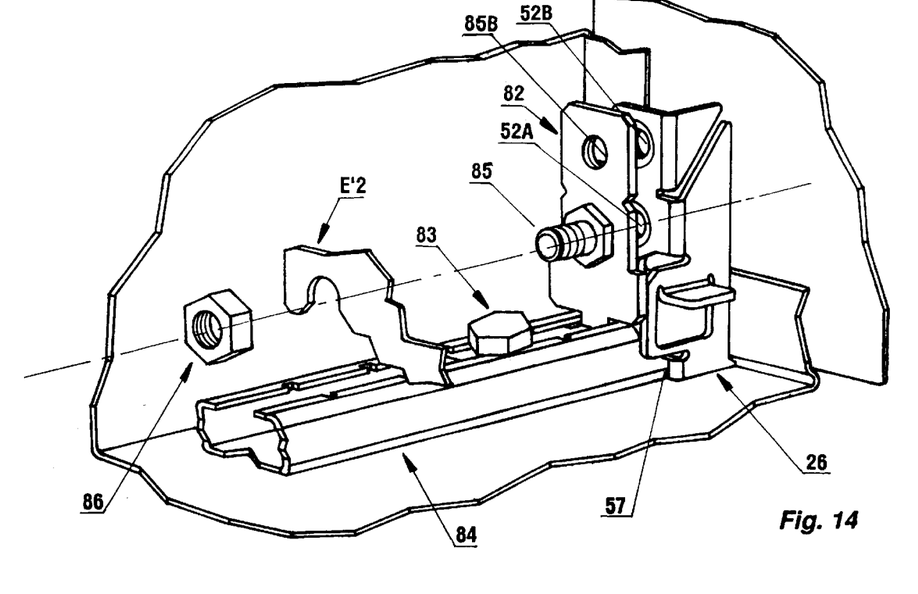

In the embodiment shown in FIG. 14 the plates constituting the equipment E2 or E'2 are fixed to each of the corner pieces 26 by means of a bracket 82 fixed by a screw 83 to a slide 84 and immobilized by a given point on the slide 84, with two screwthreaded holes staggered in the height wise direction, respectively aligned with the screwthreaded holes 52A, 52B in the corner piece 26. Only one of these holes can be seen in FIG. 14, namely a screwthreaded hole 85B in line with the screwthreaded hole 52B in the corner piece 26.

Depending on whether the plate concerned constitutes an equipment E2 or E'2, a stud 85 is screwed into one or other of the screwthreaded holes and a nut 86 is then used to fix the plate to the bracket 82.

As shown here, for example, the stud 85 is inserted into the screwthreaded hole in the bracket 82 facing the screwthreaded hole 52A in the corner piece 26 when, as shown here, the plate concerned constitutes an equipment E'2.

In accordance with the invention the slide 84, which is parallel to the edge of the corresponding corner area A of the surround 11, has a tongue (not visible in FIG. 14) at the free end, i.e. at the same end as the corner piece 26, which extends its middle part and which is inserted into the notch 57 of the corner piece 26.

This advantageously immobilizes the slide 84 on the corner piece 26 and the slide is additionally fixed, in a manner known in itself, to the wall concerned of the surround 11, by means of a stud projecting from that wall for this purpose, either the bottom wall 13 of the surround 11, as shown here, or its top wall 12.

Of course, the present invention is not limited to the embodiment described and shown but encompasses any variant execution thereof.

In particular, in a simplified embodiment, the support means provided on the corner piece in accordance with the invention is reduced to a single screwthreaded hole.

What is claimed is:

1. An enclosure comprising:
   a surround including a top wall, a bottom wall and sidewalls,
   corner areas being located at intersections of the bottom wall and sidewalls and at intersections of the top wall and the sidewalls,
   a rear support frame along a rear edge of said surround,
   a back panel bearing against an outer surface of said rear support frame,
   respective corner members being located inside said surround in each of said corner areas, and
   fixing means for fixing said back panel to said corner members,
   said corner members having support means for fixing enclosure equipment inside said surround.

2. The enclosure according to claim 1, wherein said fixing means extends through said back panel and into engagement with the respective corner members, said fixing means being operable from outside the enclosure.

3. The enclosure according to claim 2, wherein said fixing means comprise self-tapping screws passing freely through respective apertures in respective holes in said back panel.

4. The enclosure according to claim 1, wherein said fixing means also extend through said rear support frame.

5. The enclosure according to claim 1, wherein each of said corner members has at least one fixing hole for fixing an external support for the enclosure.

6. The enclosure according to claim 5, wherein each of said corner members comprises a flange extending parallel to said rear support frame and in contact therewith, said flange being in engagement with said fixing means, each of said corner members also comprising an upright extending parallel to said sidewalls, said support means for fixing enclosure equipment being provided on said upright, said back panel having holes aligned with said at least one fixing hole of each of said corner members and said flange of each said corner members having an aligned access recess.

7. The enclosure according to claim 6, wherein said rear support frame has holes aligned with said holes in said back panel.

8. The enclosure according to claim 6, wherein said flange of each of said corner members is extended by a folded-over lug having a screwthreaded hole in line with an opening in said flange.

9. The enclosure according to claim 8, wherein two spaced bridges define a bend between each of said lugs and an adjoining portion of the respective flange, said bridges being of substantially smaller width than that of said lug.

10. The enclosure according to claim 9, wherein one or more of said lugs is adapted to be unfolded and brought substantially into alignment with the respective flange.

11. The enclosure according to claim 6, further comprising removable plugs for closing-off said holes in said back panel.

12. The enclosure according to claim 6, wherein said flange of said corner members is extended by a lug having a screwthreaded hole, the lug being joined to an adjoining portion of the respective flange by two spaced bridges, the lug being substantially in alignment with the respective flange.

13. The enclosure according to claim 1, wherein each of said corner members comprises a flange extending parallel to said rear support frame and in contact therewith, said flange being in engagement with said rear support frame, each of said corner members also comprising an upright extending parallel to said sidewalls, said support means for fixing enclosure equipment being provided on said upright.

14. The enclosure according to claim 13, wherein said flange of each of said corner members includes a recess in alignment with a corner area of said rear support frame.

15. The enclosure according to claim 13, wherein said upright of each of said corner members comprises at least a first, lateral panel and a second, front panel, said first, lateral panel adjoining said flange of said corner member and extending substantially perpendicularly thereto and said second, front panel extending from said first, lateral panel remote from said flange and parallel thereto.

16. The enclosure according to claim 15, wherein said upright of each of said corner members is of U-shaped cross-section and comprises a further lateral panel parallel to the said first, lateral panel and extending from said front panel remote from the said first, lateral panel.

17. The enclosure according to claim 16, wherein said second, lateral panel of each of said corner members includes a transversely projecting bracket perpendicular to said first, lateral panel and said second, front panel, said bracket defining said support means of said corner members.

18. The enclosure according to claim 15, wherein said support means comprises at least one screwthreaded hole for fixing enclosure equipment thereon.

19. The enclosure according to claim 18, wherein two vertically spaced screwthreaded holes are provided on said upright of each of said corner members.

20. The enclosure according to claim 15, wherein said further, lateral panel of said upright of each of said corner member has a projecting nose at an intersection between a bottom edge and a free edge, said nose being engageable in a bend defined between said rear support frame and an adjoining wall of said surround.

21. The enclosure according to claim 1, wherein said support means comprises at least one screwthreaded hole for fixing enclosure equipment thereon.

22. The enclosure according to claim 1, wherein said support means on said corner members comprises at least one transversely projecting bracket.

23. The enclosure according to claim 1, wherein said rear support frame is set back relative to a rearmost edge of said surround and joined thereto by a bend, whereby said back panel is recessed inside the contour of said rearmost edge.

24. The enclosure according to claim 23, wherein said back panel has a hollow boss located in each corner area having an outer surface substantially in alignment with said rearmost edge.

25. The enclosure according to claim 1, wherein said back panel is glued to said rear support frame.

26. An enclosure according to claim 1, wherein said rear support frame is in one piece construction with said top wall, bottom wall and sidewalls.

27. An enclosure comprising:

a surround including a top wall, a bottom wall and sidewalls, corner areas being located at intersections of the bottom wall and sidewalls and at intersection of the top wall and the sidewalls, a rear support frame along a rear edge of said surround, a back panel bearing against an outer surface of said rear support frame, receptive corner members being located inside said surround in each of said corner areas, fixing means for fixing said back panel to said corner members, said corner members having support means for fixing enclosure equipment inside said surround, said corner members comprising a plurality of panels, with folds therebetween, generally at right angles to one another and generally parallel to said sidewalls and said back panel.

28. The enclosure of claim 27, wherein said support means of each of said corner members comprises at least one screwthreaded hole in one of said panel thereof.

29. The enclosure of claim 28, wherein said at least one screwthreaded hole is disposed in a said panel of said corner member parallel to said rear support frame.

30. The enclosure of claim 27, wherein one of said panels of each of said corner members is parallel to and bears against an interior surface of said rear support frame.

\* \* \* \* \*